US010902015B2

(12) United States Patent
Bourbonnais et al.

(10) Patent No.: US 10,902,015 B2
(45) Date of Patent: Jan. 26, 2021

(54) PARALLEL REPLICATION OF DATA TABLE PARTITION

(71) Applicant: International Business Machines Corporation, Armonk, NY (US)

(72) Inventors: Serge Bourbonnais, Palo Alto, CA (US); Austin F. M. D'Costa, Beaverton, OR (US); Xiao Li, San Jose, CA (US); Jonathan W. Wierenga, Petone (NZ); Xin Wu, Beijing (CN); Christian Zentgraf, Columbus, OH (US); Xiang W. Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 15/410,276

(22) Filed: Jan. 19, 2017

(65) Prior Publication Data
US 2018/0203913 A1 Jul. 19, 2018

(51) Int. Cl.
*G06F 17/00* (2019.01)
*G06F 7/00* (2006.01)
*G06F 16/27* (2019.01)

(52) U.S. Cl.
CPC .................................. *G06F 16/27* (2019.01)

(58) Field of Classification Search
CPC ...................................................... G06F 16/27
USPC ........................................................ 707/628
See application file for complete search history.

(56) References Cited

U.S. PATENT DOCUMENTS

| 6,625,593 | B1 * | 9/2003 | Leung ............... G06F 16/24532 707/999.004 |
| 7,072,924 | B1 * | 7/2006 | Purcell ...................... G06F 7/58 708/253 |
| 7,490,083 | B2 | 2/2009 | Bourbonnais et al. |
| 7,587,432 | B2 | 9/2009 | Pauly et al. |
| 7,870,174 | B2 | 1/2011 | Eadon et al. |
| 8,250,029 | B2 | 8/2012 | Holenstein et al. |
| 8,332,793 | B2 | 12/2012 | Bose |
| 8,352,425 | B2 | 1/2013 | Bourbonnais et al. |
| 9,294,097 | B1 * | 3/2016 | Vassiliev .......... H03K 19/17704 |

(Continued)

OTHER PUBLICATIONS

Anonymously; Method and System for Handling Multiple Data Replication Commands in Parallel; http://ip.com/IPCOM/000201830D; Nov. 24, 2010. pp. 1-3.

(Continued)

*Primary Examiner* — Pavan Mamillapalli
(74) *Attorney, Agent, or Firm* — Robert C. Bunker

(57) ABSTRACT

Several replication subscriptions are defined for a table in a database management system. The table is divided into partitions. Each replication subscription replicates transactions to a range of partitions. Subscriptions are assignable to different consistency groups. Transaction consistency is preserved at the consistency group level. A persistent delay table is created for each of several apply functions. Each apply function processes replication subscriptions for one consistency group, to replicate the table to a target table in parallel. Transactions for a given range of a partition are executed in parallel. When an apply function upon a row of the target table results in an error, the row is stored in the delay table. Application of each row in the delay table is repeatedly retried, and if successful, the row is removed from the delay table.

12 Claims, 4 Drawing Sheets

(56) References Cited

U.S. PATENT DOCUMENTS

| | | | |
|---|---|---|---|
| 10,031,935 B1* | 7/2018 | Cole | G06F 16/278 |
| 10,235,407 B1* | 3/2019 | Morkel | G06F 16/284 |
| 2002/0091814 A1* | 7/2002 | Arendt | G06F 9/5061 |
| | | | 709/223 |
| 2002/0173984 A1* | 11/2002 | Robertson | H04L 67/34 |
| | | | 709/220 |
| 2008/0046400 A1* | 2/2008 | Shi | G06F 16/24532 |
| | | | 707/999.002 |
| 2010/0191884 A1* | 7/2010 | Holenstein | G06F 11/2094 |
| | | | 710/200 |
| 2015/0186490 A1 | 7/2015 | Denuit et al. | |

OTHER PUBLICATIONS

IBM; "Global Mirror Super Sessions"; http://ip.com/IPCOM/000190187D; Nov. 19, 2009. pp. 1-5.

* cited by examiner

| Time | Application at the source | Source DB contents | CG1 apply | CG2 apply | Target DB contents |
|---|---|---|---|---|---|
| 0 | - | 15,C  16,B | - | - | 15,C  16,B |
| 1 | delete 15,C<br>update 16,B -><br>16,C<br>(commit) | 16,C | - | update 16,B<br>16,C<br>-duplicate key | 15,C, 16,B |
| 2 | | | delete 15,C | | 16,B |
| 3 | | 16,C | | | 16,B<br>Data is<br>CORRUPTED.<br>Missing update. |

Table T2

FIG. 1

| Time | Application at the source | Source DB contents | CG1 apply | CG2 apply | Target DB contents |
|---|---|---|---|---|---|
| 0 | | 15,C, 16.B | | | 15,C, 16.B |
| 1 | delete 15,C<br>update 16,B -><br>16,C<br>(commit) | 16,C | - | update 16,B  16,C<br>-803 duplicate key<br>DELAY the update | 15,C, 16,B |
| 2 | | | delete 15,C<br>OK | | 16,B |
| 3 | | 16,C | | retry time?<br>YES: try update<br>again<br>16,B  16,C<br>sqlcode 0 | 16,C |
| 4 | | 16,C | | | 16,C |

Table T3

FIG. 2

| Time | Application at the source | Source DB contents | CG1 apply | CG2 apply | Target DB contents |
|---|---|---|---|---|---|
| 0 | | 15,B | | | 15,B |
| 1 | update 15,B -> 16,B<br>delete 16 | empty | | insert 16,B<br>-803 duplicate key<br>DELAY the insert | |
| 1 | | empty | | delete 16<br>delete DELAYED ROW | 15,B |
| 2 | | empty | delete 15,C<br>OK | | empty |
| 3 | | empty | | | empty |
| 4 | | empty | | | empty |

Table T4

FIG. 3

| SQL operation | Check in delaying |
|---|---|
| INSERT | Row AFTER KEY value == BEF_REPLKEY_HASH |
| UPDATE | Row AFTER KEY value == AFT_REPLKEY_HASH |
| DELETE | Row BEFORE KEY value == AFT_REPLKEY_HASH |
| KEY UPDATE | Row BEFORE KEY value == AFT_REPLKEY_HASH , and<br>Row AFTER KEY value == BEF_REPLKEY_HASH |

Table T5

FIG. 4

| SQL OPERATION | BEF_REPLKEY_HASH | AFT_REPLKEY_HASH | AFTER_VALUE |
|---|---|---|---|
| INSERT | NULL | AfterKey(INS) | AfterPay(INS) |
| UPDATE / KEY UPDATE | BeforeKey(UPD) | AfterKey(UPD) | AfterPay(UPD) |
| DELETE* *(cannot get -803) | n/a | n/a | n/a |

Table T6

FIG. 5

| Time | Application | source contents | CGA apply | CGA SPILLQ | CGA Spill AGENT | CGB apply | Target contents |
|---|---|---|---|---|---|---|---|
| 0 | | 1Ac | | | | | 1Ac |
| 1 | LOAD part A | 1Ac | create SPILLQ | empty | | | 1Ac |
| 1 | upd 1Ac-1Ad | 1Ad | spill upd 1Ac | upd 1Ac-1Ad | UNLOAD part A does not contain row 1 | | empty (load first truncates) |
| 2 | del 1 | empty | spill del 1 | upd 1Ac-1Ad del 1 | | | empty |
| 3 | insert 1Bc | 1Bc | - | upd 1Ac-1Ad del 1 | | insert 1Bc | 1Bc At this point the target table contains row 1Bc. But, the spilled rows on CGA have not yet been processed. |
| 4 | - | 1Bc | - | empty | LOADDONE Start processing SPILLQ: upd 1Ac-1Ad | | 1Ad |
| 5 | - | 1Bc | - | empty | del 1 | | empty |

Table T8

FIG. 7

| OPERATION | delaying CHECK MATCH | delaying ACTION | DBMS Target Table ACTION |
|---|---|---|---|
| INSERT | AfterKey(INS) => BeforeKey(DelayIN) | Remove BEF_REPKEY_HASH from DelayIN (set to null), but keep the entry with AFT_REPLKEY_HASH intact. | 1) DELETE in table where Key=BeforeKey(DelayIN) ; 2) Execute INSERT as is |
| UPDATE | AfterKey(UPD) => AfterKey(DelayIN) | MERGE the new UPDATE AfterPay payload with the AFTERVAL payload in DelayIN. | Execute the MERGED row from delaying IF the delaying row has BeforeKey, the merged row is executed as UPDATE ELSE the delaying row only has AfterKey the merged row is executed as INSERT |
| DELETE | BeforeKey(DEL) => AfterKey(DelayIN) | DELETE entry from DelayIN. | IF Delayin has BeforeKey, then : DELETE in table where Key=BeforeKey(DelayIN) ELSE NO-OP (treat delete as done) |
| KEY UPDATE (check #1) | AfterKey(KEYUPD) => BeforeKey(DelayIN) | Remove BEF_REPKEY_HASH from DelayIN (set to NULL), but keep the entry with AFT_REPLKEY_HASH intact. | 1) DELETE in table where Key=BeforeKey(DelayIN) ; 2) Perform check #2 : IF KEY UPDATE check #2 does not match, then Execute KEY UPDATE as is. ELSE proceed with actions for check #2 below |
| KEY UPDATE (check #2) | BeforeKey(KEYUPD) => AfterKey(DelayIN) | Change AFT_REPL_KEY_HASH in DelayIN to AfterKey(KEYUP) MERGE the new KEYUPD AfterPay payload with the AFTERVAL payload in | Execute the MERGED row from delaying. IF the delaying row has BeforeKey, the merged row is executed as UPDATE ELSE the delaying row only has |

Table T7

FIG. 6

PARALLEL REPLICATION OF DATA TABLE PARTITION

BACKGROUND

The present invention relates to database management systems (DBMS), and more specifically to active/active DBMS configurations, where two or more DBMSs are kept synchronized using log-capture/transaction replay software replication technology. In such a configuration, the DBMSs are fully active and independent of each other. Replicating database transactions does not require any locking or coordination across DBMSs. Instead, captured log records in one DBMS are transformed into data manipulation and data definition language statements that are executed at each target DBMS.

An Active/Active configuration provides Continuous Availability (CA) throughout planned maintenance, outages, and disaster. Maintenance activities include system, hardware, or software upgrades, migrations, and new deployments. Outages can be caused, for example, by component failure, or by performance degradation due to system overload. Disasters involve unrecoverable data loss, which might be caused by the loss of a site following a catastrophe, such as a flood, earthquake, etc.

In order to ensure availability, typically one or more hot failover sites are kept synchronized with a primary site using software replication. These hot failover sites are used for switching applications during unavailability of the primary site for these applications, or following a disaster. Applications transactions can run at any site, but are generally routed to one site at a time for specific pieces of data in a manner that avoids change conflicts. Failover can be for an individual application or for a subset of the transactions issued by an application, for example transactions from a subset of the clients for an enterprise, not necessarily for the entire site. In an active-active configuration, each DBMS can continuously process transactions.

Low end-to-end replication latency is critical for failover in case of unplanned outages as well as for live reporting and analytics, because the amount of data that would be lost in case of a disaster, and data staleness for queries executed against a replica correspond to the replication latency. Whenever latency exceeds thresholds, a target database can no longer be used for outage failover and/or queries. With DBMS and hardware available at the present time, acceptable latency for the technology described herein is typically sub-second, even at distances exceeding thousands of kilometers, and for volumes of changes can reach a million rows changed per second.

Existing replication technologies cannot meet the sub-second latency objective when replicating massively parallel jobs independently modifying partitions of a single relational table. With existing technologies, using multiple parallel replication threads for different partitions of a single table introduces a risk of data corruption of the target table.

A relational table is divided into horizontal partitions that are defined by key ranges. A row belongs to a partition if the partitioning key for this row falls within the defined range. The partitioning key is usually distinct from the primary key of the table, if any. DBMS provide operations at the partition-level, such as backup-restore or the ability to drop or add an individual partitions from/to a table, but enforce any table-level constraints such as a unique index across all partitions. For scalability, partitions are often individually updated by applications, allowing for very high parallelism and high volumes of transactions across a single table.

Existing replication technologies allow, changes for a partition to be replicated independently from the changes to other partitions. However, any movement of rows across partitions, or any sequence of delete and inserts that might reuse the same value for table-level globally enforced constraints, can lead to data corruptions when the changes are replicated out of order among different partitions. Sequencing the apply of the changes can only be ensured within the replication thread for each individual partition or set of partitions, but not across partitions. The reason for this is that coordinating the replication for all partitions prevents parallelism. That is, replication for one partition cannot hold back until there is certainty of no conflicting change for the same row in another partition. For example, a row might be deleted from partition 1 and inserted into partition 2 with the same value for some unique constraint, if each partition is replicated independently of all others. Then the insert into partition 2 might be replicated before the delete of this row from partition 1. As a result, the insert will fail because it will violate the uniqueness constraint that is enforced by the DBMS at the table-level.

An example of efficient and scalable replication technology is the "Q Replication" technology, which is available from International Business Machines Corporation of Armonk, N.Y. This technique allows independent replication subscriptions to be defined to replicate only data that belong to a specific partition by evaluating clause filter on the partition number when capturing log records. The data for these independent subscriptions is replicated and applied across parallel replication processes.

A replication Consistency Group (CG) is a set of tables replicated within one process, for which transaction consistency is preserved. With existing technology a CG corresponds to the replication stream for one partition or sets of partitions. Parallel replication across multiple CGs can lead to data corruption, if and when inter-partition row movements are applied out of order, as well as if and when values for global constraints are deleted and reused. For at least these reasons, there is a need for improved database replication techniques.

SUMMARY

According to one embodiment of the present invention, techniques are provided for data replication. Several replication subscriptions are defined for a table in a database management system. The table is divided into several partitions. Each replication subscription replicates transactions to a range of partitions. Replication subscriptions are assignable to different consistency groups, and transaction consistency is preserved at the consistency group level. A persistent delay table is created for each of several apply functions. Each apply function processes one or more replication subscriptions for one consistency group. The replication subscriptions to replicate the table to a target table are executed in parallel. The execution of the replication subscriptions uses the apply functions. Within each replication subscription, transactions for a given range of a partition are executed in parallel. When an apply function upon a row of the target table results in an error caused by an out-of-order replay of changes involving movement of a row between replication consistency groups or by a sequence of transactions that violates a global constraint across all partitions of the table, the row causing the error is stored in a persistent delay table, where the row causing the error is delayed without disrupting the execution of the corresponding apply functions for other rows in the current transaction or other transactions. At a predefined time interval, retrying application of each row in the delay table is retried. If there is a successful retried application of the row in the delay table, the row is removed from the delay table.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

FIGS. 1-7 are exemplary tables that illustrate the contents of the DBMS in various situations, in accordance with different embodiments of the invention.

Like reference symbols in the various drawings indicate like elements.

DETAILED DESCRIPTION

The various embodiments of the invention pertain to techniques for database replication. In accordance with different embodiments described herein, changes to a table partition or a set of table partitions are allowed to be replicated in parallel without any synchronization across the parallel replication processes. That is, each replication process is allowed to proceed independently, without having to wait for the replication of changes to partitions that are replicated by another process. This is achieved by relying on errors reported by the target DBMS to detect conflicts, and then postponing conflicting row changes until the state of the target database allows the row changes to be successfully applied.

Conflicts caused by data corruptions at the target, such as a user deliberately deleting a row at the target database before the target database is updated, can be detected by comparing delayed row changes for each CG after all CGs have been applied up to a common point. This can be done offline so that no overhead is introduced, thereby providing linear replication scalability.

Furthermore, conflicts caused by corrupted data on a target system can be identified and reported by leveraging a common area where each CG can periodically report its progress and track the progress of other CGs. In one embodiment, the common area is implemented as a relational table that contains one row for each replication CG. Some techniques for doing this are described in U.S. patent application Ser. No. 14/199,370, filed on Mar. 6, 2014, and assigned to the assignee of the present application, which application is hereby incorporated by reference in its entirety. Furthermore, as will be explained below, the techniques described herein also include techniques for performing initial load at a target for a range of partitions from an active source DBMS.

Replication subscriptions for table partitions allow a high degree of parallelism when replicating workloads where multiple independent threads in a distributed system concurrently update different partitions of a single table. A replication subscription can be defined to replicate only a range of partitions instead of the entire table. In one embodiment, transactions for a single table can thus be replicated using several capture processes, send queues, transmission channels, receive queues, apply processes, and so on, for higher parallelism and linearly scalable throughput. It should be noted that while the present specification assumes that sequences of DBMS changes are sent from a source database to a target database using queue transport, there are many other implementations for sending DBMS changes from a source database to a target database, which are familiar to those having ordinary skill in the art.

In one embodiment, each apply process applies changes for one CG independently from other apply processes. When more than one CG is used in a replication configuration, data changes are replicated with eventual consistency. A transaction at a source DBMS is split if the transaction modifies tables that are assigned to different CGs. When a subscription is for the entire table, changes to the same row of the same table are replicated sequentially in the source commit order within a CG, but if there are several independent subscriptions for different partitions of the same table that are assigned to different CGs, then changes to the same row will be applied in parallel and might be applied out-of-order.

As was described above, changes that involve inter-partition row movement and globally unique index constraints across subscriptions can result in conflicts when applied out of order. In one embodiment, such conflicts are resolved by delaying changes until the conditions causing the conflicts have been cleared by other CGs making progress. It can be determined that the condition has cleared by retrying the failed change. For suspected out-of-order conflicts (for example, SQL error: duplicate row, unique constraint violation) the apply function spills the row that gets the error into a persistent delay table, hereinafter also referred to as a "DELAYIN," until pre-requisite changes have been attempted on other replication CGs or until it can be determined whether or not the conflict was caused by external application changes at the target.

In one embodiment, there is one DELAYIN table per apply function instance. The DELAYIN tables are used for persisting delayed changes for all CGs, processed by each apply function instance. Changes for a CG are delivered in one receive queue. A row in the DELAYIN table always holds its latest value for the CG if multiple successive updates are made to this row.

The apply function retries entries in the DELAYIN table at a CG-level retry interval. In one embodiment, the recommended default retry interval is one second. A delayed row succeeds on retry when the change on the other CG that caused the row to fail has finally been applied. As there is no direct coordination between CGs, the techniques described herein rely on the premise that a retry will eventually succeed if and when the other CGs catch up to or get past the same point in time in applying changes. If another CG is down and never comes back, the condition cannot be resolved, because changes are missing.

In one embodiment, the Apply function can differentiate between errors caused by out of order Apply actions across different CGs and errors caused by applications making conflicting changes at the target database, optionally, by using a synchronized apply function that uses a table shared by all CGs to report their progress. This table, hereinafter referred to as the "MCGSYNC table," is used to periodically record CG progress that include the log sequence number of the commit for the last transaction applied, and assess the progress of other CGs and to determine when to give up waiting for another CG to apply dependent changes and instead report an exception. This is described in further detail in U.S. patent application Ser. No. 14/199,370, which is incorporated by reference above.

If the synchronized apply function described above is not enabled, the Apply function keeps retrying at each specified time interval, as long as there are entries left in the DELAYIN table. Replication conflicts can then be identified by the presence of residual entries in the DELAYIN table after all CGs have caught up to a common consistency point, that is, when all replication queues are drained and after the capture programs have stopped having read up to a common point in the source RDMS logs Subscriptions by partitions do not introduce any measurable processing overhead in the apply function, because there is no direct coordination between CGs that would require CGs to wait on each other. Instead, inter-partition movements and across partitions global dependencies are handled by reacting to errors returned by the target DBMS and delaying resolution to until another change comes for this row on the same CG, or until a determined retry period is reached, allowing other CGs to make progress in the meantime. This reactive method for dealing with dependencies between CGs allows uninterrupted parallel apply of transactions for sustaining high replication throughputs.

Specific operations of various embodiments of the invention will now be described by way of example and with reference to the drawings. It should be noted that these are merely illustrative examples and that many variations are within the grasp of those having ordinary skill in the art.

Rows Being Moved Between CGs

An application might move a row across partitions that are replicated by different CGs, either by updating the partitioning key value for the row, or by deleting the row and then re-inserting the row into a new partition that is replicated on another CG.

In accordance with embodiments described herein, rows moved across CGs are replicated as deletes/inserts. An update of a partition key that causes a row to move across CGs is flagged by a capture process in the transaction message sent to the apply process, so that the apply function can differentiate deletes and inserts for partitions that are replicated within the same CG from partitions resulting from the movement of a row into a partition that is replicated by a different CG.

For example, consider a table T1(c1a int, c1b int, region int, c3 int, name varchar), where:
 (c1a, c1b) is a unique key that is used as the replication key,
 (region) is the partitioning key,
 (c3) is a second unique key, Assume this table contains a row with the values: (1000, 99, 'TX', 5, 'DAN') and a subscription called CG1 for partition 1 that corresponds to region 'TX' and another subscription called CG2 for partition 2 that corresponds to region 'CA'. Table T1 is now updated with the following statement:
 update T1 set (region='CA') where c3=5;
Since c3 is a unique key, only one row is modified.

The capture process for CG1 will send a delete. The capture process for CG2 will send an insert. This ensures that changes are always matched at the target, independently of the number of partitions that are replicated for the table. The delete/insert will be flagged in the transaction message sent to the apply process as originating from a partition key update that caused the row to be replicated across 2 CGs A partitioning key update for a row that stays in the same CG is sent as a 'regular' update. The capture process compares the before/after partition number on the update log records to determine whether the update moves the row across CGs.

As another example, consider a table where partition 1 is replicated by CG1 and partitions 6 to 7 are replicated by CG2. In this example, the partitioning key is also the primary key and is used as the replication key.

update (1,A)→(6,A)—Moves row with key 1 to another CG. Operation replication on CG1: DELETEP—Operation on CG2: INSERTP
 update (6,A)→(7,A)—Change partitions, but in same CG. Operation on CG1: nothing—Operation on CG2: UPDATE If only the originating partition is subscribed to for replication, the row is not replicated once it is moved to the new partition. For example, assuming only one subscription to partitions 1-5:
 update (1,A)→(6,A)—Moves row with key 1 to another partition. On Q1: DELETEP is sent—no insert is sent because partition 6 is not subscribed for replication
 update (6,A)→(6,B)—nothing is sent, partition 6 is not subscribed
 update (6,B)→(1,B)—Moves back to first partition. On Q2: nothing is sent; On Q1: INSERTP is sent.

Secondary Unique Index Value Reuse in a Partition Replicated by a Different CG.

Deleting a row from one partition and then inserting or updating a different row into another partition, while reusing a value from the old row for a secondary unique index will yield a table-level constraint violation in the apply function if the insert is applied before the delete against the target table. The following example illustrates this problem.

In Table T2, shown in FIG. 1, row 15 and row 16 belong to different partitions that are replicated on different CGs. The capture process sends a partitioning key update that crosses CGs as a delete from the old CG and an insert into the new CG. If the insert into the new partition arrives before the delete from the old partition, as shown at time Time=1, the insert fails with a duplicate row error. Different sequences of changes applied out-of-order can also yield this conflict.

To solve this problem, the apply function must hold back the conflicting changes into the DELAYIN table until it can be determined that a dependent change that is replicated on a different CG has been attempted.

Delaying Lookup and Apply Actions

Apply Delay Rows that Conflict:

As was described above, the DELAYIN table, one per apply process instance, is used to store row changes that are presumed to have arrived too early. The DELAYIN table contains one entry for each row for which changes must be delayed. The apply agent that detects the conflict inserts the first row, and the row is subsequently updated with the latest value when multiple changes arrive out of order for this row. For example, if a row moved to CG2 and the insert into CG2 arrives before the delete from CG1, the row is inserted into the DELAYIN table. If this row is later updated in CG2, the entry for this row in the DELAYIN table contains the results of the last update. The row is finally applied once the delete for the row is applied on CG1.

Apply Retries Delayed Rows at Every Retry Interval.

Parallel apply process agents look up and attempt to apply a delayed row each time a new change for the row arrives. It should be noted that this is an in-memory lookup using the replication key hash value already computed by a receive queue browser for dependency analysis and has a complexity of O(1). There is one receive queue serviced by one receive queue browser for each CG. The receive queue browser dispatches transactions on a work queue to be applied in parallel by a pool of apply agents, after the receive queue browser has determined that those transactions do not modify any common row within the CG. However, finishing to apply all of out-of-order change sequences within the CG will not necessarily clear the delayed change, because the enabling condition for the delayed row change might be triggered by another CG. Each apply browser and agents processing the receive queue for a CG only sees its own delaying rows and not those of other CGs. Therefore, the apply function retries entries in the DELAYIN table at specific intervals, as per an apply receive queue retry value for the CG.

The operation that clears the blocking condition (e.g., deleting the row so that the insert for the same key might succeed) might be performed on another CG as illustrated by Table T3, shown in FIG. 2. In this case, data consistency is restored when apply of the row is re-tried.

Identifying Conflicts Caused by External Applications (External Target Data Corruptions).

The apply function differentiates between errors caused by out-of-sequence apply across multiple partitions, and errors caused by conflicting changes made outside of replication. If a row is updated at the source, but deleted at the target by another user before the update is replicated, then when the update arrives at the target, the update fails with a 'row not found' error, which the apply function must report as a replication conflict.

The apply function can also get a 'row not found' error for some out-of-sequence replays with replication by table partitions if applied blindly without checking for existence of this row in the DELAYIN table. For example, if a partitioning key update moves a row across partitions that are replicated on different CGs, and this row is later deleted, the insert and delete operation in the new partition might arrive before the row is deleted from the old partition and the delete on the new partition will then fail with 'row not found'. The apply function must remember that this delete should be matched with the prior insert, which would be stored in DELAYIN table because it would have encountered 'duplicate' failure due to row still existing in the old partition. The delete for the new partition would therefore have to be 'applied' against the DELAYIN row instead, by deleting the insert operation from the DELAYIN table, with the result being that nothing gets applied on the new partition, which is the correct net expected result. The following example, as illustrated by Table T4, shown in FIG. 3, illustrates this sequence. Here the replication key is also the partitioning key and is the first column in the table.

Because both CGs apply changes to the same table, each apply process is guaranteed to see all changes once replication has caught up to or past a common point. If by then, the row is still in conflict, it indicates that source and target were not consistent to begin with. Conflicting changes are reported as an exception, provided the synchronized apply described above is enabled, otherwise they remains as a stale entry in the DELAYIN table.

Changes within each CG arrive to the target in source commit order, so out-of-order conflicts are only possible when a global constraint is violated, or when the source and target are inconsistent because of applications making conflicting changes (exceptions).

When the before value of a row in the DELAYIN table matches the before value for a delete, the apply function applies its "after" value. For example, if the delayed entry is 1, 6A (that is, replication key is 1 and after image is 6A), the Apply function inserts 6A when the row with key 1 is deleted. 6A could be the result of several successive updates to the row inserted in the partition, none of which could be applied because the row had not been deleted from the old partition by the other replication CGs.

In some embodiments, the DELAYIN table is cached in memory to eliminate overhead, and persisted to disk for recoverability. The majority of the time, the DELAYIN table is expected to be empty; nonetheless it is cached in memory and accessed via a hash table on the replication key.

Leveraging the Apply Processes Shared Table to Detect Conflicts:

The apply function can determine when it is time to "give up retry" for a change that will never happen and report a conflict, by leveraging the MCGSYNC table. That is, the MCGSYNC table acts as a common area where all CGs post information about their progress, and where each CG reads the progress of all other participating CGs. A CG does not need to know how many other CGs are involved.

By comparing a Commit Log Sequence Number (LSN), also referred to as "COMMITSEQ" of the transaction that gets a conflict to the LSN of the commit for which all prior transactions have been applied by other CGs (also referred to as "OLDEST_TRANS"), the apply function can determine when to give up retry. The apply function persists the COMMITSEQ of the transaction for each row stored in the DELAYIN table. The apply function reads the MIN(OLDEST_TRANS) among all other active CGs from the MCGSYNC table.

Stale Entries in the DELAYIN Table Caused by Conflicts

A user can determine whether there is a conflict by stopping all capture processes at the same timestamp or LSN in the source DBMS log and letting the apply processes drain their respective receive queues. This can be achieved by stopping the replication queues for all CGs after data changes are captured to the same LSN from the source RDBMS logs and all data changes captured have been applied. With Q Replication, this can be achieved by issuing a command STOPQ CAPTUREUPTO STOPAFTER=data_applied using the same stop value for all CGs. After all data has been applied for all CGs, any entry in the DELAYIN table represents a conflict.

If there are stale rows in the DELAYIN table and the apply processes do not use the MCGSYNC table, to the conflicts can be identified by comparing the source and target tables. Commercial replication products, such as IBM Q replication provide table compare utilities that can compare tables while they are being updated and replicated, such as he IBM ASNTDIFF table compare utility.

Apply Agent Method for Delaying Lookup and Actions

The DELAYIN table is an in-memory hash table on the row replication key hash value.

For each replicated row operation, the apply agent first checks if a corresponding replication key value exists in DELAYIN as shown by Table T5 in FIG. 4.

If there is no matching row in the DELAYIN table, the apply agent executes the row operation against the target table.

If this execution fails with a duplicate row error, the row is inserted into the DELAYIN table by the apply agent, as per the rules shown in Table T6, shown in FIG. 5.

If there is a matching row in the DELAYIN table. The apply agent updates the DELAYIN table entry. It may need to execute the SQL against the target table with key and payload values that are different from the original values, as per the rules in Table T7, shown in FIG. 6.

Apply Browser Retry Method for the DELAYIN Table

After all operations have been attempted, the final value for a row might still reside in the DELAYIN table because the action that will allow this row to be inserted is performed on a different CG. Therefore a timer-based retry mechanism is required to apply rows left in the DELAYIN table. The frequency of retries is controlled by a delay interval parameter that is configured at the CG level.

The retry is performed by the browser that services the receive queue for the CG, as follows:

First, each apply agent records the time when a new/merged row image in DELAYIN table first gets a duplicate row in ERROR_TIME.

Subsequent errors on retry do not change ERROR_TIME.

Subsequent row operation on the same row that requires merging with existing row image in delaying, does change ERROR_TIME if it gets a retry error on the merged image Second, the apply function keeps track of how far ahead other CGs are at the time of this first error in MAX_RETRY_UPTO_LSN. This field establishes the point at which it can be asserted that any preceding changes have been applied.

MAX_RETRY_UPTO_LSN=MAX(MCGSYNC (MAX_CMT_SEQ_READ)) this is the max across all CGs.

MAX_RETRY_UPTO_LSN is current only after all CGs have refreshed their MCGSYCN entries. Therefore MAX_RETRY_UPTO_LSN must be recorded when MCGSYNC MIN(UPDATE_TIME)>ERROR_TIME. The apply process will retry until this condition is true.

Third, the deterministic retry stop point is reached when all of the following conditions occur:

the row retry attempt still fails, AND all CGs have finished processing all the transactions that they had read ahead at the time of the first error, AND my CG has finished processing all the transactions up to MAX_RETRY_UPTO_LSN point, AND the row image in delaying did not change further due to subsequent operations The condition boils down to: MCGSYNC MIN(OLDEST_TRANS)>MAX_RETRY_UPTO_LSN.

Apply Spill Agent Processing

A replication technology must support initial load of the target table, before incremental changes can be replicated. The load process must be achievable without any interruption of transaction processing on the source table against the source table.

Products such as IIDR Q Replication perform initial load of the target tables by unloading data from the source database. Until the target table is loaded, changes that are replicated from the source table are spilled into a spill queue. The backlog of changes in the spill queue is applied once the initial load has completed. This is described in further detail, in U.S. Pat. No. 7,330,860, entitled "Fault tolerant mechanism to handle initial load of replicated object in live system," which is incorporated herein by detail it its entirety.

When clearing up the spill queue, the spill agent must include the partitioning key range in the WHERE clause for applying each spilled row, to ensure that the spill agent is updating only rows that belong to this subscription. The following example, shown in Table T8 of FIG. 7, illustrates why this is necessary.

Assume that there are two subscriptions, for partitions A and B, respectively. For example, row 1Ac is a row with replication key 1 in partition A, and has a third column with value c that has no index.

To solve this problem, the spill agent ensures that spilled rows do belong to the partitions for the subscription, as follows.

CGA: spill agent SPILLQ processing:

Update row 1 where partition key has a value between (part A low key, and part A high key).

If the row is not found, force the spilled row as insert. As the forced insert itself will get 'duplicate' store the original update in the DELAYIN table.

Delete row 1 operation will first check against the DELAYIN table.

The delete will match the delayed update in DELAYIN table and therefore delete the delayed row in DELAYIN table instead of applying the delete to the target table. Both databases now contain the row 1Bc after the spill queue has been cleared.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A replication method comprising:
   defining a plurality of replication subscriptions for a table in a database management system, wherein:
      the table is divided into a plurality of partitions,
      each replication subscription replicates transactions to a range of partitions,
      replication subscriptions are assignable to different consistency groups, and
      transaction consistency is preserved at the consistency group level;
   creating a persistent delay table for each of a plurality of apply functions, wherein each apply function processes one or more replication subscriptions for one consistency group;
   executing, in parallel, the replication subscriptions to replicate the table to a target table, wherein:
      the execution of the replication subscriptions uses the apply functions, and
      within each replication subscription, transactions for a given range of a partition are executed in parallel;
   in response to an apply function upon a row of the target table resulting in an error caused by an out-of-order replay of changes involving movement of a row between replication consistency groups or by a sequence of transactions that violates a global constraint across all partitions of the table, storing in a persistent delay table the row causing the error, wherein the row causing the error is delayed without disrupting the execution of the corresponding apply functions for other rows in the current transaction or other transactions;
   at a predefined time interval, retrying application of each row in the persistent delay table; and
   in response to a successful retried application of the row in the persistent delay table, removing the row from the persistent delay table.

2. The method of claim 1, wherein executing the replication subscriptions further comprises:
   prior to executing the transaction of the apply function, determining whether any row that is a target for the transaction is stored in the persistent delay table; and
   in response to determining that the target of the row transaction is stored in the persistent delay table, processing the row in the persistent delay table, wherein for updates, the row in the persistent delay table reflects the latest updated values of the corresponding replication subscription.

3. The method of claim 1, wherein a shared communication table is used to keep track the progress among all consistency group apply functions to identify conflicts caused by a target data mismatch that is introduced by external applications making changes at the target table, further comprising:

comparing a commit sequence value for the row in the persistent delay table to a minimum value of a latest transaction performed for all other consistency groups as logged in the shared communication table, wherein the commit sequence value is stored with the row in the persistent delay table; —in response to the commit sequence value being less than the minimum value of the latest transaction, suspending the retrying of the row in the persistent delay table; and reporting the row in the persistent delay table as an exception.

4. The method of claim 1, wherein, when the apply function performs an initial load of the target table that uses a spill queue mechanism, executing further comprises:

prior to applying each row in a spill queue table, comparing a partitioning key of a row in the target table to partitioning key limits of the replication subscription having initiated the initial load; and in response to the partitioning key of the row in the target table being outside the partitioning key limits, deleting the row from the spill queue table in the event of a delete transaction, or storing the row in the persistent delay table in the event of an update transaction, and attempting to periodically force the transaction as an insert into the target table until the transaction is successfully applied to the target table by deleting the duplicate row from the conflicting partition.

5. A system for data replication comprising:

a processor;

a memory storing instructions executable by the processor;

a first database management system; and a second database management system, wherein the first and second database management systems are connected over a network in an active/active configuration and are synchronized using transaction replay technology, and wherein the processor is configured to execute the instructions stored in the memory to perform a method comprising:

defining a plurality of replication subscriptions for a table in the first database management system, wherein:

the table is divided into a plurality of partitions, each replication subscription replicates transactions to a range of partitions, replication subscriptions are assignable to different consistency groups, and transaction consistency is preserved at the consistency group level;

creating a persistent delay table for each of a plurality of apply functions, wherein each apply function processes one or more replication subscriptions for one consistency group;

executing, in parallel, the replication subscriptions to replicate the table to a target table in the second database management system, wherein:

the execution of the replication subscriptions uses the apply functions, and within each replication subscription, transactions for a given range of a partition are executed in parallel;

in response to an apply function upon a row of the target table resulting in an error caused by an out-of-order replay of changes involving movement of a row between replication consistency groups or by a sequence of transactions that violates a global constraint across all partitions of the table, storing in a persistent delay table the row causing the error, wherein the row causing the error is delayed without disrupting the execution of the corresponding apply functions for other rows in the current transaction or other transactions;

at a predefined time interval, retrying application of each row in the persistent delay table; and in response to a successful retried application of the row in the persistent delay table, removing the row from the persistent delay table.

6. The system of claim 5, wherein executing the replication subscriptions further comprises:

prior to executing the transaction of the apply function, determining whether any row that is a target for the transaction is stored in the persistent delay table; and in response to determining that the target of the row transaction is stored in the persistent delay table, processing the row in the persistent delay table, wherein for updates, the row in the persistent delay table reflects the latest updated values of the corresponding replication subscription.

7. The system of claim 5, wherein a shared communication table is used to keep track the progress among all consistency group apply functions to identify conflicts caused by a target data mismatch that is introduced by external applications making changes at the target table, further comprising:

comparing a commit sequence value for the row in the persistent delay table to a minimum value of a latest transaction performed for all other consistency groups as logged in the shared communication table, wherein the commit sequence value is stored with the row in the persistent delay table; —in response to the commit sequence value being less than the minimum value of the latest transaction, suspending the retrying of the row in the persistent delay table; and reporting the row in the persistent delay table as an exception.

8. The system of claim 5, wherein, when the apply function performs an initial load of the target table that uses a spill queue mechanism, executing further comprises:

prior to applying each row in a spill queue table, comparing a partitioning key of a row in the target table to partitioning key limits of the replication subscription having initiated the initial load; and in response to the partitioning key of the row in the target table being outside the partitioning key limits, deleting the row from the spill queue table in the event of a delete transaction, or storing the row in the persistent delay table in the event of an update transaction, and attempting to periodically force the transaction as an insert into the target table until the transaction is successfully applied to the target table by deleting the duplicate row from the conflicting partition.

9. A computer program product for data replication, the computer program product comprising a computer readable storage medium having program instructions embodied therewith, the program instructions executable by a processor to cause the processor to:

define a plurality of replication subscriptions for a table in a database management system, wherein:

the table is divided into a plurality of partitions, each replication subscription replicates transactions to a range of partitions, replication subscriptions are assignable to different consistency groups, and transaction consistency is preserved at the consistency group level;

create a persistent delay table for each of a plurality of apply functions, wherein each apply function processes one or more replication subscriptions for one consistency group;

execute, in parallel, the replication subscriptions to replicate the table to a target table, wherein:

the execution of the replication subscriptions uses the apply functions, and within each replication subscription, transactions for a given range of a partition are executed in parallel;

in response to an apply function upon a row of the target table resulting in an error caused by an out-of-order replay of changes involving movement of a row between replication consistency groups or by a sequence of transactions that violates a global constraint across all partitions of the table, store in a persistent delay table the row causing the error, wherein the row causing the error is delayed without disrupting the execution of the corresponding apply functions for other rows in the current transaction or other transactions;

at a predefined time interval, retry application of each row in the persistent delay table; and in response to a successful retried application of the row in the persistent delay table, remove the row from the persistent delay table.

10. The computer program product of claim 9, wherein the instructions to execute the replication subscriptions further comprises instructions to:

prior to executing the transaction of the apply function, determine whether any row that is a target for the transaction is stored in the persistent delay table; and in response to determining that the target of the row transaction is stored in the persistent delay table, process the row in the persistent delay table, wherein for updates, the row in the persistent delay table reflects the latest updated values of the corresponding replication subscription.

11. The computer program product of claim 9, wherein a shared communication table is used to keep track the progress among all consistency group apply functions to identify conflicts caused by a target data mismatch that is introduced by external applications making changes at the target table, further comprising instructions to:

compare a commit sequence value for the row in the persistent delay table to a minimum value of a latest transaction performed for all other consistency groups as logged in the shared communication table, wherein the commit sequence value is stored with the row in the persistent delay table; —in response to the commit sequence value being less than the minimum value of the latest transaction, suspend the retrying of the row in the persistent delay table; and report the row in the persistent delay table as an exception.

12. The computer program product of claim 9, wherein, when the apply function performs an initial load of the target table that uses a spill queue mechanism, the instructions to execute further comprise instructions to:

prior to applying each row in a spill queue table, compare a partitioning key of a row in the target table to partitioning key limits of the replication subscription having initiated the initial load; and in response to the partitioning key of the row in the target table being outside the partitioning key limits, delete the row from the spill queue table in the event of a delete transaction, or store the row in the persistent delay table in the event of an update transaction, and attempt to periodically force the transaction as an insert into the target table until the transaction is successfully applied to the target table by deleting the duplicate row from the conflicting partition.

* * * * *